United States Patent [19]

Peck

[11] 4,066,446

[45] Jan. 3, 1978

[54] THERMALLY BLOATED FIRECLAY (SCR VERILITE) LADLE INSULATION

[75] Inventor: George L. Peck, Pittsburgh, Pa.

[73] Assignee: General Refractories Company, Bala Cynwyd, Pa.

[21] Appl. No.: 703,611

[22] Filed: July 8, 1976

[51] Int. Cl.² .......................... C22B 9/10; C04B 31/00
[52] U.S. Cl. ............................................ 75/96; 75/257; 106/75; 106/100
[58] Field of Search ...................... 106/75, 100; 75/94, 75/96

[56] References Cited

U.S. PATENT DOCUMENTS

| | | | |
|---|---|---|---|
| 2,462,255 | 2/1949 | Charman | 106/75 |
| 2,855,191 | 10/1958 | Blaha | 106/100 |
| 3,516,821 | 6/1970 | Neu | 75/94 |

*Primary Examiner*—Peter D. Rosenberg
*Attorney, Agent, or Firm*—Howson and Howson

[57] ABSTRACT

The exposed surface of a molten metal, particularly iron and steel, is protected by a thermally insulating layer of finely divided particles of thermally bloated fireclay.

15 Claims, No Drawings

THERMALLY BLOATED FIRECLAY (SCR VERILITE) LADLE INSULATION

Powdered materials have been applied to the surface of molten metal for such purposes as protecting the molten metal from oxidation and providing heat insulation. For example, it has been the practice for some time to shovel loose or bulk material upon the surface of the metal to be insulated. Vermiculite, expanded shale aggregate and perlite have been used as such insulating covers (see e.g. U.S. Pat. Nos. 2,462,255 and 3,516,821). However these materials present several disadvantages. When vermiculite is applied to the surface of the molten metal in steel and iron ladles, it creates a very dusty situation along with brown smoke which rises over the ladle as it continues to break down and expand. Expanded shale is a very dusty material comprised of particles which vary considerably in size. It contains an undesirably high quantity of carbon which can interact with steel and lower its quality. Being quite dense, ladle blankets or covers of such material are relatively heavy. Perlite is unsuitable as a cover for steel ladles because it cannot withstand steel making temperatures, e.g. 2800° F., without melting.

An object of the present invention is to provide a novel method for projecting and insulating molten metal, particularly iron and steel, which overcomes the difficulties above described.

Another object of this invention is to provide a method for treating molten steel by applying to the surface thereof a particulate material which is relatively dust free, does not contain carbon which would interact with the steel and lower its quality, and which provides improved thermal insulation.

These and other objects and features of novelty will become apparent from the following detailed description of the invention and appended claims.

This invention contemplates a method for treating molten metal which comprises applying to the surface of molten metal a thermally insulating layer of finely divided particles of thermally bloated fireclay. The method is particularly useful in the treatment of molten iron and steel in ladles.

Advantageously, the particulate material used in the method of this invention, by reason of its expanded or bloated state, provides excellent thermal insulation which means less heat loss from the metal. This is particularly important in the handling of molten iron and steel in ladles in order to minimize skull formation and to maintain a more uniform temperature throughout the pour of the heat from the ladle.

The cover material used in the method of this invention has a relatively low density on the order of about 25 to about 35 pounds per cubic foot. Thus, a blanket or cover thereof weighs only about half of that formed for example of expanded shale aggregate and having the same thickness. Being substantially carbon free, interaction with the molten metal, which can lower its quality, is avoided.

The method of this invention also overcomes the dust and smoke problem inherent in the use of certain prior known thermal blanket materials such as vermiculite and expanded shale aggregate. This is most important in minimizing environmental pollution. Since the thermally expanded fireclay employed in the process has a relativey high fusion point it does not melt at steel making temperatures.

Other advantages of the method of this invention are longer holding times of metal in ladles before the metal drops below the critical pouring temperature, reduction in energy requirements to maintain heat on the ladle lining in preparation for reuse in subsequent heats, and a higher percentage of clean, skull-free pours.

Although the method of this invention is particularly useful in the treatment of iron and steel in ladles, it nevertheless may be used to advantage in the treatment of non-ferrous metals such as copper and aluminum which are held in ladles for pouring. The method of this invention also finds use in treating solidifying metal castings, particularly ingots.

The particulate material which protects the surface of and thermally insulates the molten metal is a thermally bloated fireclay. The fireclay must be a lightweight clay aggregate that is thermally expanded or bloated.

A particularly preferred fireclay for use in this invention analyzes chemically approximately as follows:

|  | Weight Percent |
|---|---|
| Loss on ignition | 0.38 |
| $SiO_2$ | 59.26 |
| $Fe_2O_3$ | 2.37 |
| $Al_2O_3$ | 30.49 |
| $TiO_2$ | 1.76 |
| CaO | 0.62 |
| MgO | 0.55 |
| $K_2O$ | 1.71 |
| $Na_2O$ | 0.63 |

The thermally bloated fireclay has a bulk density (loose fill) of about 25 to about 35, preferably 27–32, pounds per cubic foot. The fireclay has the appearance of coarse mason sand and has a relatively small particle size range such that substantially 100 percent passes through a 10 Mesh sieve (Tyler Standard Sieve) and is retained on a 28 Mesh screen. Advantageously from the dust standpoint the clay is substantially free of dust-producing fines. The fusion point of the clay is in the range of about 2980° to 3020° F., i.e. above steel making temperatures. Thus, when placed in contact with molten steel in the method of this invention, it does not fuse.

The bloated fireclay used in the method of this invention may be prepared by means of the apparatus and method described in U.S. Pat. No. 2,855,191. According to this patent, small clay particles are converted into hollow fired, i.e. fused bodies of multicellular form, by fusing the particles at a temperature in the range of 2500° to 3500° F. The size of the particles so formed may vary as operating conditions are varied, but ordinarily, the hollow bodies will have a diameter not so great as to enable passage through an 8 Mesh screen.

In carrying out the method of this invention, the molten metal to be treated is placed in a suitable container, e.g. a refractory-lined ladle, and the thermally bloated fireclay is placed in contact with the exposed surface of molten metal. Being a bulk material it may be shoveled onto the molten metal surface to be protected and insulated or thrown over the surface as for example from a measuring container. Alternately, and preferably, the bloated fireclay is packed in combustible containers, such as a paper bag designed to hold a predetermined quantity, and one or more of such containers may be thrown upon the surface of the molten metal.

The quantity of bloated fireclay used to provide a protective and thermally insulating layer of desired thickness for the molten metal will vary considerably depending upon such factors as surface area, metal temperature, whether the metal is to be maintained in a molten condition as for example in a ladle from which it is subsequently poured, or the metal is to be permitted to solidify as in ingot formation. Those skilled in the art, knowing the result they desire, will encounter no difficulty in determining the necessary blanket thickness and the quantity of bloated fireclay required to provide such a blanket or cover.

In case of ladles for steel, excellent results have been obtained by means of blankets varying in thickness of from about 2 to about 6 inches.

What is claimed is:

1. The method of treating molten metal which comprises applying to the exposed surface of molten metal a thermally insulating and protective layer of finely divided particles of a thermally bloated fireclay.

2. The method according to claim 1 in which said fireclay particles are fused bodies of substantially multicellular form.

3. The method according to claim 2 in which said fireclay particles have a bulk density of from about 25 to about 35 pounds per cubic foot and a particle size such that substantially 100 percent pass through a 10 mesh sieve but are retained on a 28 mesh sieve.

4. The method according to claim 3 in which said fireclay has the following chemical analysis:

|  | Percent by weight |
|---|---|
| Loss on ignitin | 0.38 |
| $SiO_2$ | 59.26 |
| $Fe_2O_3$ | 2.37 |
| $Al_2O_3$ | 30.49 |
| $TiO_2$ | 1.76 |
| CaO | 0.62 |
| MgO | 0.55 |
| $K_2O$ | 1.71 |
| $Na_2O$ | 0.63 |

5. The method according to claim 1 in which said metal is a ferrous metal.

6. The method according to claim 1 in which said metal is a non-ferrous metal.

7. The method of treating molten steel which comprises applying to the exposed surface of molten steel a thermally insulating and protective layer of finely divided particles of a thermally bloated fireclay.

8. The method according to claim 7 in which said fireclay particles are fused bodies of substantially multicellular form.

9. The method according to claim 8 in which said fireclay particles have a bulk density of from about 27 to about 32 pounds per cubic foot and a particle size such that substantially 100 percent pass through a 10 mesh sieve but are retained on a 28 mesh sieve.

10. The method according to claim 9 in which said fireclay has the following chemical analysis:

|  | Percent by Weight |
|---|---|
| Loss on Ignition | 0.38 |
| $SiO_2$ | 59.26 |
| $Fe_2O_3$ | 2.37 |
| $Al_2O_3$ | 30.49 |
| $TiO_2$ | 1.76 |
| CaO | 0.62 |
| MgO | 0.55 |
| $K_2O$ | 1.71 |
| NaO | 0.63 |

11. The method according to claim 10 in which said steel is stainless steel.

12. A method for maintaining steel in a molten condition in a refractory-lined container to enable subsequent pouring of said molten steel therefrom which comprises applying to the exposed surface of said molten steel in said container a thermally insulating and protective layer of finely divided particles of a thermally bloated fireclay.

13. The method according to claim 12 in which said fireclay particles are fused bodies of substantially multicellular form.

14. The method according to claim 13 in which said fireclay particles have a bulk density of from about 27 to about 32 pounds per cubic foot and a particle size such that substantially 100 percent pass through a 10 mesh sieve but are retained on a 28 mesh sieve.

15. The method according to claim 14 in which said fireclay has the following chemical analysis:

|  | Percent by weight |
|---|---|
| Loss on Ignition | 0.38 |
| $SiO_2$ | 59.26 |
| $Fe_2O_3$ | 2.37 |
| $Al_2O_3$ | 30.49 |
| $TiO_2$ | 1.76 |
| CaO | 0.62 |
| MgO | 0.55 |
| $K_2O$ | 1.71 |
| $Na_2O$ | 0.63 |

* * * * *